United States Patent Office 2,852,331
Patented Sept. 16, 1958

2,852,331

LOW VISCOSITY STABILIZED VAT DYE PASTES

Earl Lincoln Youse, Port Huron, Mich., assignor to General Aniline & Film Corporation, New York, N. Y., a corporation of Delaware No Drawing. Application June 1, 1955
Serial No. 512,590

19 Claims. (Cl. 8—34)

This invention relates to the preparation of stable, low viscosity aqueous pastes of vat dyes and in particular 3,3' - dichloro - N - dihydro-1,2,1',2'-anthraquinoneazine which has the following structural formula

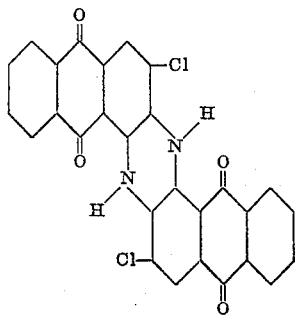

and to such stabilized, low viscosity compositions.

Since in the synthesis of vat dyes, the final dye product is usually obtained as an aqueous paste, and since it is desirable to have such dyes worked up in such aqueous systems prior to their use in vat dyeing processes, it is not economically feasible to prepare the dry dyestuff powder and leave it to the ultimate dyer to prepare the necessary aqueous dye dispersions.

One of the major obstacles, however, in offering aqueous dye pastes to the dyer has been the tendency of such aqueous dye pastes to thicken, settle and dry out on storage. It might be expected that to overcome such difficulties a higher water-to-dye ratio in the original paste would be the answer. This is not so. The dye pigment concentration must be kept relatively high not only for the obvious economic reason that handling and shipping costs of highly dilute dye dispersions would be prohibitive but for various practical reasons. Thus, the ultimate consumer, that is, the dyer, usually requires a certain minimum dye concentration. Further, settling, in the highly dilute dye dispersions, is severe and leads to a non-uniformly dyed product which obviously is undesirable since control of the dye concentration is most critical in order to obtain uniformity in the dyeing process.

It is thus evident that the high pigment-to-water ratio pastes are the most desirable provided the problems of thickening, settling and drying out can be overcome.

Concomitant with the above problems is the one of high viscosity related to small particle size of the pigment. Since the smaller the pigment size, the better is the dye development, it follows that it is not only desirable but necessary to have as small a dye particle size as possible in order to obtain efficient and uniform dyeings. However, as the particle size decreases, the degree of hydration and thixotropy increases, producing a thick paste. It is clear then that to obtain the best possible dyeings using small dye particle size one faces the conflict with high viscosity, the disadvantages of which have been pointed out above.

A common means employed to combat thick pastes is the addition of a surface active agent. Such surfactants include sodium lignosulfonate, magnesium lignosulfonate, partially desulfonated lignin sulfonate, the condensation products of naphthalene sulfonates with formaldehyde, alkyl aryl sulfonates, alcohol sulfates, long chain alkyl sulfonates, nonionics of the type produced by the interaction of a plurality of moles of alkylene oxide (ethylene, propylene and butylene oxides) with phenols, alcohols, amines, mercaptans and the like. These surfactants, however, are completely inadequate in the instant dye system.

I have now discovered that aqueous vat dye pastes of low viscosity in a stable form may be obtained by incorporating in the pastes a small quantity of certain liquid or low-melting oxygenated organic compounds.

It is, therefore, an object of the present invention to provide low viscosity, form-stable aqueous dye pastes of the dye 3,3'-dichloro - N - dihydro-1,2,1',2'-anthraquinoneazine by incorporating therewith a small quantity of a substantially non-volatile, water-insoluble, alkali-soluble, oxygenated organic compounds which is either a liquid at room temperature or has a melting point below about 60° C. The use of these organic compounds to provide such low viscosity, form-stable vat dye pastes constitutes a further object of my invention.

Other objects and advantages will become apparent from the following description and examples.

The viscosity reducing agents of the present invention are substantially non-volatile organic compounds. They are also substantially water-insoluble, that is, they are soluble to the extent of less than 1% by weight based on the weight of water. Additionally, these compounds are characterized by being alkali-soluble or saponifiable, and further they are all oxygen-containing compounds. The contemplated compounds, hereinafter called "thinning agents," which may be neutral or acidic in nature, include the following:

| | |
|---|---|
| Dibutyl phthalate | Caprylic acid |
| Amyl acetate | Epichlorohydrin |
| Octyl phenol | Oleic acid |

The particular mechanism by which these compounds function to stabilize the instant vat dye paste at a low viscosity has not been ascertained. These compounds are not surface active agents and their effect is not attributable to a wetting action.

The quantity of the thinning agent employed will vary but is usually in an amount ranging from about ½% to 5% by weight based on the total dye paste weight.

It is desirable to include in the dye pastes, a dispersing agent of the surface active type mentioned above. The amount of said agent is not critical and may be used in any desired amounts consistent with economy. Usually from 1 to 10% based on the weight of the dye press cake is employed.

The thinning agents may be mixed together and sufficient water added to provide the desired pigment-water ratio. On the other hand, the dye may be slurried with water, the thinnning agent added and the slurry filtered and then the press cake treated with water to give the desired pigment-water ratio.

My method envisages the mechanical manipulation of the pigment in water after addition of the thinning agent as by means of a ballmill or the like.

The invention is illustrated by the follwing examples, but it is to be understood that the invention is not restricted thereto.

EXAMPLE 1

200 g. of 3,3-dichloro-N-dihydro-1,2,1',2'-anthraquinoneazine presscake (17.5% dyestuff) are mixed with 4 g. of sodium lignosulfonate, 2.5 g. of oleic acid, and 109.8 g. of water. This mixture which contained a real dye concentration of 11% is ball-milled for 16 hours. A very thin paste results. The thinned paste remains stable on long storage.

The same composition without the "thinning agent" gelled badly on storage.

Continued and lengthy ball-milling of the thin, stable vat dye paste had no deleterious effects, such as increasing the viscosity, as is the usual case with regular "unthinned" dye pastes. This characteristic of the "thinned" pastes is extremely valuable since it permits of longer ball-milling for effecting reduction of pigment aggregates without increasing the viscosity of the pastes or causing them to become thick.

On testing this paste against a standard 20% paste composition, the sample dyed cotton from a leuco vat both about equal to the standard.

Padding of leuco vat on cotton followed by development in alkaline developer for 2, 5 and 10 minutes, washed and compared gave the following results:

2 minutes—5% stronger than standard
5 minutes— 10–15% stronger than standard
10 minutes—5% stronger than standard

EXAMPLE 2

200 g. of 3,3'-dichloro-N-dihydro-1,2,1',2'-anthraquinoneazine presscake (17.5% dyestuff) are mixed with 4 g. of sodium lignosulfonate, 2.2 g. caprylic acid and 110 g. water. This mixture which contained a real dye concentration of 11% is ball-milled for 16 hours. The resulting paste is water thin and has no settling tendency. The paste is stable on long storage. When tested as in Example 1, the sample dyed 2–3% stronger and on pads was 5–10% stronger

EXAMPLE 3

167 g. of 3,3' - dichloro - N-dihydro-1,2,1',2'-anthraquinoneazine presscake (17.5% dyestuff) are mixed with 3.5 g. sodium lignosulfonate, 17.5 g. epichlorohydrin and 162 g. water and ball-milled for 16 hours. The resulting paste was water-thin and extremely stable on long storage. The dyeing characteristics of this composition were somewhat better when tested as described in Example 1.

EXAMPLE 4

200 g. of 3,3'-dichloro-N-dihydro-1,2,1',2'-anthraquinoneazine presscake (15.6% dyestuff) are mixed with 4 g. sodium lignosulfonate, 9 g. of dibutyl phthalate and 70 g. water and ball-milled overnight. The resulting paste was very thin and remained stable on long storage. This paste produced dyeings comparable to those of Example 1.

EXAMPLE 5

200 g. of 3,3'-dichloro-N-dihydro-1,2,1',2'-anthraquinoneazine presscake (17.5% dyestuff) are mixed with 4 g. sodium lignosulfonate, 3.3 g. amyl acetate and 108.9 g. water and ball-milled overnight. The resulting paste was very thin and remained stable on long storage. This paste produced dyeings comparable to those of Example 1.

EXAMPLE 6

200 g. of 3,3'-dichloro-N-dihydro-1,2,1',2'-anthraquinoneazine presscake (17.5% dyestuff) are mixed with 4 g. sodium lignosulfonate, 2 g. octyl phenol and 110.3 g. water and ball-milled overnight. The resulting paste was very thin and remained stable on long storage. This paste produced dyeings comparable to those of Example 1.

In the following examples, 200 g. of 3,3'-dichloro-N-dihydro-1,2,1',2'-anthraquinoneazine (17.5% dyestuff) are used with 4 g. of sodium lignosulfonate. The amount of water is adjusted to give a final dye concentration of 11%. The amount of thinning agent is given as a percent of the total paste. The compositions are ball-milled for about 16 hours.

|  | Thinning agent | Dye Paste Consistency |
|---|---|---|
| Example 7 | 2% oleic acid | Very thin. |
| Example 8 | 2% dibutyl phthalate | Thin. |
| Example 9 | 3% dibutyl phthalate | Thin. |
| Example 10 | 4% dibutyl phthalate | Thin. |

The compositions of Examples 7–10 are very stable and exhibit no settling characteristics.

In the following examples (11–60) the dye paste compositions of each group 11–20, 21–30, 31–40, 41–50 and 51–60 are similar to those of Examples 1–10, respectively, with the exception of the dispersing agent. The pastes are prepared in a similar manner and all are water-thin stable pastes.

*Dispersing agent*

Example 11—partially desulfonated sodium lignin sulfonate
Example 12—partially disulfonated sodium lignin sulfonate
Example 13—partially desulfonated sodium lignin sulfonate
Example 14—partially desulfonated sodium lignin sulfonate
Example 15—partially desulfonated sodium lignin sulfonate
Example 16—partially desulfonated sodium lignin sulfonate
Example 17—partially desulfonated sodium lignin sulfonate
Example 18—partially desulfonated sodium lignin sulfonate
Example 19—partially desulfonated sodium lignin sulfonate
Example 20—partially desulfonated sodium lignin sulfonate
Example 21—naphthalene sulfonate-formaldehyde condensation product
Example 22—naphthalene sulfonate-formaldehyde condensation product
Example 23—naphthalene sulfonate-formaldehyde condensation product
Example 24—naphthalene sulfonate-formaldehyde condensation product
Example 25—naphthalene sulfonate-formaldehyde condensation product
Example 26—naphthalene sulfonate-formaldehyde condensation product
Example 27—naphthalene sulfonate-formaldehyde condensation product
Example 28—naphthalene sulfonate-formaldehyde condensation product
Example 29—naphthalene sulfonate-formaldehyde condensation product
Example 30—naphthalene sulfonate-formaldehyde condensation product
Example 31—sodium isopropyl naphthalene sulfonate
Example 32—sodium isopropyl naphthalene sulfonate
Example 33—sodium isopropyl naphthalene sulfonate
Example 34—sodium isopropyl naphthalene sulfonate
Example 35—sodium isopropyl naphthalene sulfonate
Example 36—sodium isopropyl naphthalene sulfonate
Example 37—sodium isopropyl naphthalene sulfonate
Example 38—sodium isopropyl naphthalene sulfonate
Example 39—sodium isopropyl naphthalene sulfonate
Example 40—sodium isopropyl naphthalene sulfonate
Example 41—sodium salt of cetyl alcohol sulfate
Example 42—sodium salt of cetyl alcohol sulfate
Example 43—sodium salt of cetyl alcohol sulfate
Example 44—sodium salt of cetyl alcohol sulfate
Example 45—sodium salt of cetyl alcohol sulfate Example 46—sodium salt of cetyl alcohol sulfate
Example 47—sodium salt of cetyl alcohol sulfate
Example 48—sodium salt of cetyl alcohol sulfate
Example 49—sodium salt of cetyl alcohol sulfate
Example 50—sodium salt of cetyl alcohol sulfate
Example 51—sodium salt of the dioctyl ester of sulfosuccinic acid
Example 52—sodium salt of the dioctyl ester of sulfosuccinic acid
Example 53—sodium salt of the dioctyl ester of sulfosuccinic acid
Example 54—sodium salt of the dioctyl ester of sulfosuccinic acid
Example 55—sodium salt of the dioctyl ester of sulfosuccinic acid
Example 56—sodium salt of the dioctyl ester of sulfosuccinic acid
Example 57—sodium salt of the dioctyl ester of sulfosuccinic acid
Example 58—sodium salt of the dioctyl ester of sulfosuccinic acid
Example 59—sodium salt of the dioctyl ester of sulfosuccinic acid
Example 60—sodium salt of the dioctyl ester of sulfosuccinic acid The presscakes used in the above examples may be obtained by any of the usual means employed in the trade as for example precipitation from sulfuric acid into water followed by filtration.

Various modifications of the invention will occur to persons skilled in the art. For example, instead of using a ball mill as in the example, other mills such as an Epenbach or Premier mill may be used with equal effectiveness. I therefore do not intend to be limited in the patent grant except as necessitated by the prior art and the appended claims.

I claim:

1. A vat dye composition in paste form comprising a dispersion of 3,3'-dichloro-N-dihydro-1,2,1',2'-anthraquinoneazine in water by means of an anionic dispersing agent, said dispersion being stabilized at low viscosty with a stabilizing agent selected from the group consisting of caprylic acid, oleic acid, octyl phenol, dibutyl phthalate, and epichlorhydrin.

2. The composition of claim 1 wherein the dispersing agent is a reaction product of formaldehyde with a naphthalene sulfonate.

3. The composition of claim 1 wherein the stabilizing agent is caprylic acid.

4. The composition of claim 1 wherein the stabilizing agent is epichlorohydrin.

5. The composition of claim 1 wherein the stabilizing agent is octyl phenol.

6. The composition of claim 1 wherein the stabilizing agent is dibutyl phthalate.

7. The composition of claim 1 wherein the dispersing agent is sodium lignosulfonate.

8. The composition of claim 7 wherein the stabilizing agent is 2% oleic acid based on the weight of the total dye paste composition.

9. The composition of claim 1 wherein the stabilizing agent is oleic acid.

10. The composition of claim 9 wherein the oleic acid is present in an amount ranging from ½% to 5% by weight of the dye paste composition.

11. A vat dye composition in paste form comprising an aqueous dispersion of 3,3'-dichloro-N-dihydro-1,2,1',2'-anthraquinoneazine, sodium lignosulfonate, and from ½ to 5% oleic acid based on the weight of the dye paste.

12. A vat dye composition in paste form comprising an aqueous dispersion of 3,3'-dichloro-N-dihydro-1,2,1',2'-anthraquinoneazine, sodium lignosulfonate and from ½ to 5% caprylic acid based on the weight of the dye paste.

13. A vat dye composition in paste form comprising an aqueous dispersion of 3,3'-dichloro-N-dihydro-1,2,1',2'-anthraquinoneazine, sodium lignosulfonate and from ½ to 5% epichlorohydrin based on the weight of the dye paste.

14. A vat dye composition in paste form comprising an aqueous dispersion of 3,3'-dichloro-N-dihydro-1,2,1',2'-anthraquinoneazine, sodium lignosulfonate and from ½ to 5% octyl phenol based on the weight of the dye paste.

15. A vat dye composition in paste form comprising an aqueous dispersion of 3,3'-dichloro-N-dihydro-1,2,1',2'-anthraquinoneazine, sodium lignosulfonate and from ½ to 5% dibutyl phthalate based on the weight of the dye paste.

16. A low viscosity stabilized dye composition comprising an aqueous dispersion of about 11% 3,3'-dichloro-N-dihydro-1,2,1',2'-anthraquinoneazine, an anionic dispersing agent and from ½ to 5% oleic acid.

17. A low viscosity stabilized dye composition comprising an aqueous dispersion of about 11% 3,3'-dichloro-N-dihydro-1,2,1',2'-anthraquinoneazine, an anionic dispersing agent and from ½ to 5% caprylic acid.

18. A low viscosity stabilized dye composition comprising an aqueous dispersion of about 11% 3,3'-dichloro-N-dihydro-1,2,1',2'-anthraquinoneazine, an anionic dispersing agent and from ½ to 5% octyl phenol.

19. A low viscosity stabilized dye composition comprising an aqueous dispersion of about 11% 3,3'-dichloro-N-dihydro-1,2,1',2'-anthraquinoneazine, an anionic dispersing agent and from about ½ to 5% dibutyl phthalate.

References Cited in the file of this patent

UNITED STATES PATENTS

| | | |
|---|---|---|
| 2,069,215 | Chambers | Feb. 2, 1937 |
| 2,101,828 | Wass | Dec. 7, 1937 |
| 2,211,126 | Kern | Aug. 13, 1940 |
| 2,665,188 | Schulze | Jan. 5, 1954 |

FOREIGN PATENTS

| | | |
|---|---|---|
| 318,176 | Great Britain | Nov. 27, 1930 |